United States Patent Office 3,419,501
Patented Dec. 31, 1968

3,419,501
METAL CLEANING COMPOSITION
Gert G. Levy, Detroit, Mich., assignor to Chrysler Corporation, Highland Park, Mich., a corporation of Delaware
No Drawing. Filed May 10, 1965, Ser. No. 454,727
13 Claims. (Cl. 252—137)

ABSTRACT OF THE DISCLOSURE

A composition for removing rust and scale and which is especially adapted for cleaning the cooling system of internal combustion engines. The principal component of the composition is an alkali metal salt of a polyaminopolycarboxylic acid such as the tetrasodium salt of ethylenediaminetetracetic acid. The composition is a dry powder which is used in a less than 10 percent aqueous solution and at a pH in the range of 6 to 10.

This invention relates to a composition and method for removing scale and corrosion from metallic surfaces. More particularly, this invention pertains to a composition and method for cleaning rust from systems fabricated from a variety of metals and alloys. This invention finds special application in the cleaning of rusted automobile cooling systems.

In many systems, aqueous liquids are maintained or circulated in contact with metallic surfaces with the result that serious problems of surface corrosion and formation of scale are commonly encountered therein. An example of such a system is found in the circulation of a coolant in an internal combustion engine, and accordingly, the ensuing discussion of this invention will relate to automobile cooling systems since the corrosion problems associated therewith are typical of the problems encountered in many other systems such as industrial heat exchangers and furnaces. In fact, corrosion of automobile cooling systems is more difficult to control, since considerable aeration of the coolant in the system takes place because of the high velocity of circulation and shaking of the automobile when in motion. Such aeration contributes to the rapid rate of deterioration of anti-freeze compositions commonly used in automobiles which in turn produces acidic materials which are corrosive to the cooling system metals.

Since corrosion of the cooling system is extremely detrimental to the proper performance of an engine, a great deal of work has been done to develop additives which will prevent corrosion. However, this approach has not been entirely successful since automobile cooling systems employ a variety of metal and alloys which come in contact with the coolant. Thus, even in a simple cooling system, iron, steel, brass, solder, aluminum and copper are commonly encountered metals. Accordingly, finding suitable corrosion inhibitors which will protect all of the various metals is most difficult since, in general, inhibitors which will, for example, protect aluminum will not protect iron and vice versa. Furthermore, while certain blends of inhibitors are somewhat effective, their use is prohibited due to cost. In addition, experience has shown that automobile owners frequently do not replace the coolants in the cooling system at the recommended intervals and, hence, even the most effective inhibitor additives cannot prevent rusting.

The very nature of the automobile cooling system further compounds the problems of corrosion, since due to its structure it is very difficult to clean. This difficulty stems from the fact that the corroded parts are not generally accessible so as to allow mechanical cleaning and reliance must therefore be placed entirely on chemical cleaning. At the present time, there are essentially three basic types of chemical cooling system cleaners. These are: oxalic acid cleaners, chromate based cleaners and silicate based cleaners. Of these three types, only those cleaners based on oxalic acid are really effective in removing heavy rust. However, such cleaners are not desirable since they cause rerusting very quickly and they attack and pit the unrusted metals in the system even when their use is immediately accompanied by a neutralizing solution such as sodium carbonate.

An object of the present invention, therefore, is to provide a metal cleaning composition which will remove scale and corrosion from metal surfaces.

A further object is to provide a cleaning composition which is especially effective in removing rust from ferrous metal surfaces and which will not attack or rust clean metal.

Yet another object is to provide a cleaning composition and method of application thereof which will enable the cleaning of a system, in which there are a variety of metals, in a simple and economical manner.

Other objects and advantages of this invention will become apparent from the following detailed description.

The cleaning composition of this invention is based on the discovery that a salt, preferably an alkali metal salt, of an aminopolycarboxylic acid will, when blended with certain compounds and used under certain conditions, remove scale and corrosion products from metal surfaces. My research studies extending over a period of years have revealed that salts of aminopolycarboxylic acids are especially effective in removing iron oxide rust which is the principal corrosion product found in automobile radiators. This discovery and the related research results were surprising and unpredictable since it was thought that such salts would, at best, merely chemically inactivate metal ions which were in solution. In fact, however, such salts actually loosen and break away the iron oxide scale from the base metal.

The essential components of the composition of this invention are a salt of an aminopolycarboxylic acid, an alkali metal nitrate or nitrite, and an alkali metal silicate. The composition is blended from the above components so that it contains from about 70 to 96 weight percent of the aminopolycarboxylic acid salt, about 2 to 15 weight percent of the alkali metal nitrate or nitrite, and about 2 to 15 weight percent of the alkali metal silicate, the above weight percentages being computed on the combined total weight of acid salt, nitrate or nitrite, and silicate.

The above composition is used by dissolving it in water so as to form an aqueous solution and then circulating the solution through the rusted cooling system to be cleaned so as to allow it to contact the rust deposits and scale which have formed on the metal. It has been found that the best cleaning results are obtained when the above described composition is used in concentrations of 2 to 9 ounces per gallon of water and at a pH in the range of about 6.0 to 10.0. The temperature and pressure at which the composition is used is not critical. However, in order to provide for a reasonable cleaning time, the temperature of the solution should be at least 50° F. and preferably in the range of about 100° F. to 200° F. Higher temperatures can be used, the upper temperature limit being determined by such factors as the boiling point of the solution and the temperature at which the composition will be decomposed or otherwise destroyed. No advantage is seen in using pressures greater than atmospheric.

In cleaning rusted automobile cooling systems with the composition of this invention, good results have been achieved by first draining the cooling system and refilling it with water. The composition of this invention, which for reasons of storage and handling economy is preferably in powder form, is then added to the water in the cooling system and the engine is operated so as to circulate the cleaning solution throughout the cooling system. The length of time that the cleaning composition should be in contact with the corroded metal is not critical and will be determined by the amount of corrosion, the temperature of the cleaning solution and the particular components in the solution. In an automobile cooling system, a period of about one hour has been found to be sufficient. In practice, the cleaning composition has frequently been left in the vehicle for a period of several days during which time the vehicle was driven in normal fashion. At the end of a suitable period the cleaning solution is drained from the vehicle and the clean cooling system is refilled with a suitable coolant. This latter technique has been used in a test program in which the composition of this invention was used to clean the cooling system of a number of police cars used by the City of Detroit, Michigan. The results obtained in these tests were highly successful.

The principal component of the composition of this invention is the salt of an aminopolycarboxylic acid. Any such acid salt can be used provided it is soluble in water at the concentration levels required in this invention. Preferred compounds which are readily available on the market are the alkali metal acid salts wherein the term "alkali metal" is used to include the sodium, potassium, and ammonium compounds, together with lithium and the other well-known alkali metals. Examples of aminopolycarboxylic acid salts which are suitable for use in the composition of this invention include the tetrasodium salt of ethylenediaminetetraacetic acid, the pentasodium salt of diethylenetriaminepentaacetic acid, the trisodium salt of N-hydroxyethylethylenediaminetriacetic acid and the monosodium salt of N,N-di(2-hydroxyethyl)glycine. Mixtures of such polyaminopolycarboxylic acid salts may also be used. A mixture that has given exceedingly good results in the method of this invention is a blend of the tetrasodium salt of ethylenediaminetetraacetic acid and the monosodium salt of N,N-di(2-hydroxyethyl)glycine. Excellent results have been achieved when the above mixture is made up of about 80 to 95 weight percent of the acid and about 5 to 20 weight percent of the glycine, said weight percent being based on the combined weight of the two components.

As mentioned above, the composition of this invention contains an alkali metal silicate and an alkali metal nitrate or nitrite. Because they are water soluble, readily available in powder form and at low cost, the preferred alkali metal silicate is sodium metasilicate and the preferred nitrate is sodium nitrate.

The composition of this invention is used in aqueous solution which to be effective must have a pH in the range of 6.0 to 10.0. Thus, it may be necessary, depending on the weight ranges and components incorporated therein, to adjust the pH of the solution by use of an alkaline or acidic agent. Accordingly, the composition of this invention may include, in addition to the aminopolycarboxylic acid salt, silicate, and nitrate or nitrite components, a further component whose function is to control the pH of a working solution of the composition. Any such agent commonly used in the art for pH control can be used as long as it does not react with the other components. A preferred pH control agent for use in this invention is sodium bisulfate. It will be understood, of course, that the pH control agent need not be a component of the composition since, if desired, a pH control agent can be added to the aqueous solution of the composition. The exact quantity of agent which is needed will depend on the particular components used in the composition, their concentration and the amount of the composition used to make the cleaning solution.

The following examples are set forth to more clearly illustrate the principle and practice of this invention to those skilled in the art.

EXAMPLE 1

This example shows that the composition of this invention does not attack metals which are commonly used in automobile radiators or other industrial equipment, yet is extremely effective in removing rust.

Five compositions having different amounts of aminopolycarboxylic acid salt, nitrate and silicate components were prepared as follows:

TABLE 1

| Composition | Aminopoly-carboxylic acid salt (wt. percent) | $NaNO_3$ (wt. percent) | $Na_2SiO_3$ (wt. percent) |
|---|---|---|---|
| A | 93 | 3.5 | 3.5 |
| B | 87 | 6.5 | 6.5 |
| C | 81.4 | 9.3 | 9.3 |
| D | 72.4 | 13.8 | 13.8 |
| E | 100 | 0 | 0 |

The aminopolycarboxylic acid salt used in the above compositions was a mixture of about 89 weight percent of the tetrasodium salt of ethylenediaminetetraacetic acid and 11 weight percent of the monosodium salt of N,N-di-(2-hydroxyethyl) glycine.

A working solution of each of the above compositions was prepared by dissolving approximately one ounce of composition in 1000 milliliters of water. The pH of the solution were then adjusted to a pH of 8.0 by the addition of sodium bisulfate. The aqueous solutions were then heated to a temperature of about 200° F. and 1″ x 2″ metal coupons were suspended in the cleaning solution for a period of about 8 hours. This testing procedure, and metal test specimens and preparation thereof, were in accordance with the American Society for Testing Materials (A.S.T.M.) method designated as D-1384. A 2″ x 3″ specimen of severely rusted cast iron was also placed in each of the working solutions. The rusted specimens were prepared by oxidizing the cast iron under controlled conditions so as to achieve uniform rusting on each of the cast iron specimens. The results of these tests are shown in the following table.

TABLE 2

| Composition | Wt. loss of metal coupons (milligrams) | | | | | | Percent rust removed from rusted cast iron |
|---|---|---|---|---|---|---|---|
| | Copper | Solder | Brass | Steel | Al. | Cast Iron | |
| A | 1 | 8 | 0 | 24 | 0 | 30 | 100 |
| B | 0 | 12 | 0 | 21 | 0 | 36 | 95 |
| C | 0 | 12 | 0 | 26 | 0 | 60 | 95 |
| D | 0 | 12 | 0 | 22 | 1 | 46 | 75 |
| E | 0 | 12 | 0 | 14 | 206 | 28 | 50 |

It will be observed from the data that compositions A, B, C and D were extremely effective in removing rust, and, at the same time, did not attack the various unrusted metals. Composition E, however, which is not a composition of this invention, was not at all suitable as a rust cleaner due to its severe corrosive effect on aluminum and its relative poor rust removing ability. A comparison of compositions A and E reveals the unpredictable rust removing ability of aminopolycarboxylic acid salts.

EXAMPLE 2

This example demonstrates the importance of maintaining the pH of a working solution of the composition of this invention within a range of about 6.0 to 10.0. A composition of this invention was prepared containing 81.4 weight percent of an aminopolycarboxyilc acid salt, 9.3 weight of sodium nitrate and 9.3 weight percent of sodium metasilicate. The salt component was a mixture of 89 weight percent of the tetrasodium salt of ethylenediaminetetraacetic acid and 11 weight percent of the monosodium salt of N,N-di(2-hydroxyethyl)glycine. A number of working solutions were then made up as in Example 1 by dissolving one ounce of the composition in 1000 milliliters of water. The following table shows the results obtained when 2″ x 3″ coupons of rusted and 1″ x 2″ coupons of unrusted cast iron were suspended for about 8 hours in the solutions which had been adjusted to different pH levels. In these tests, the cleaning solution was at a temperature of about 200° F. and the metal coupons were prepared and analyzed in accordance with A.S.T.M. D-1384.

TABLE 3

| Cleaning solution | pH | Wt. loss of cast iron coupon (milligrams) | Percent rust removed from cast iron |
|---|---|---|---|
| 1 | 3 | 338 | |
| 2 | 5 | 196 | |
| 3 | 7 | 19 | 100 |
| 4 | 8 | 14 | 95 |
| 5 | 9 | 9 | 90 |
| 6 | 11 | 0 | 20 |

Cleaning solution 6 was obviously not at all effective in removing rust. On the other hand, cleaning solutions 1 and 2 so severely attacked the cast iron that a dense black carbon film was left on the remaining metal and it was impossible to determine their effect on the rust itself. Accordingly, 1, 2 and 6 were totally unsuitable for use in cleaning automobile cooling systems.

It should be apparent from the foregoing description that the objects of this invention have been obtained. A metal cleaning composition has been provided which is extremely effective in removing corrosion and scale deposits and which does not attack unrusted metal.

I claim:

1. A metal cleaning composition comprising components (a), (b), and (c), said component (a) being an alkali metal water soluble salt of an aminopolycarboxylic acid, said salt containing from 1 to 3 nitrogen atoms and from 1 to 5 —CH$_2$COOM groups where M is selected from the group consisting of alkali metals and hydrogen atoms, said component (b) being a water soluble compound selected from the group consisting of alkali metal nitrates and alkali metal nitrites, and said component (c) being a water soluble alkali metal silicate, said components being present in an amount such that there is from about 70 to 96 weight percent of component (a), from about 2 to 15 weight percent of component (b), and from about 2 to 15 weight percent of component (c), said weight percents being based on the combined total weight in the composition of components (a), (b) and (c); furthermore, the composition having a pH range of about 6.0 to 10.0 when the composition is used in aqueous solution.

2. A metal cleaning composition comprising components (a), (b), and, said component (a) being selected from the group consisting of the tetrasodium salt of ethylenediaminetetraacetic acid, the pentasodium salt of diethylenetriaminepentaacetic acid, the trisodium salt of N-hydroxyethylethylenediaminetriacetic acid, the monosodium salt of N,N-di (2-hydroxyethyl) glycine and mixtures of the foregoing, said component (b) being a water soluble compound selected from the group consisting of alkali metal nitrate and alkali metal nitrite, and said component (c) being a water soluble alkali metal silicate, said components being present in an amount such that there is from about 70 to 96 weight percent of component (a), from about 2 to 15 weight percent of component (b), and from about 2 to 15 weight percent of component (c), said weight percents being based on the combined total weight in the composition of components (a), (b), and (c); furthermore, the composition having a pH range of about 6.0 to 10.0 when the composition is used in aqueous solution.

3. The composition of claim 2 wherein component (c) is sodium metasilicate.

4. The composition of claim 2 wherein component (a) comprises a mixture of the tetrasodium salt of ethylenediaminetetraacetic acid and the monosodium salt of N,N-di-(2-hydroxyethyl)glycine.

5. The composition of claim 2 wherein component (a) comprises a mixture of about 80 to 95 weight percent of the tetrasodium salt of ethylenediaminetetraacetic acid and about 5 to 20 weight percent of the monosodium salt of N,N-di(2-hydroxyethyl)glycine, said weight percent being based on the combined weight of the said acid and glycine.

6. A metal cleaning composition comprising components (a), (b), (c) and (d), said component (a) comprising a mixture of about 80 to 95 weight percent of the tetrasodium salt of ethylenediaminetetraacetic acid and about 5 to 20 weight percent of the monosodium salt of N,N-di(2-hydroxyethyl)glycine, said weight percent being based on the combined weight of the said acid and glycine, said component (b) being a water soluble compound selected from the group consisting of alkali metal nitrates and alkali metal nitrites, said component (c) being sodium metasilicate, and said component (d) being sodium bisulfate; said components being present in an amount such that there is from about 70 to 96 weight percent of component (a), from about 2 to 15 weight percent of component (b), and from about 2 to 15 weight percent of component (c), said weight percents being based on the combined total weight in the composition of components (a), (b) and (c); furthermore, the amount of component (d) in the composition being sufficient to maintain a pH range of about 6.0 to 10.0 when the composition is used in aqueous solution.

7. A metal cleaning composition comprising components (a), (b), (c) and (d), said component (a) comprising a mixture of about 89 weight percent of the tetrasodium salt of ethylenediaminetetraacetic acid and about 11 weight percent of the monosodium salt of N,N-di(2-hydroxyethyl)glycine, said weight percent being based on the combined weight of the said acid and glycine, said component (b) being sodium nitrate, said component (c) being sodium metasilicate, and said component (d) being sodium bisulfate; said components being present in an amount such that there is about 93 weight percent of component (a), about 3.5 weight percent of component (b), and about 3.5 weight percent of component (c), said weight percents being based on the combined weight in the composition of components (a), (b) and (c); furthermore, the amount of component (d) in the composition being sufficient to maintain a pH range of about 6.0 and 10.0 when the composition is used in aqueous solution.

8. A method of cleaning and removing rust from a metallic surface which comprises contacting the surface to be cleaned with an aqueous solution of a cleaning composition having a pH in the range of about 6.0 to 10.0, said composition comprising about 70 to 96 weight percent of an alkali metal salt of a aminopolycarboxylic acid, said salt containing from 1 to 3 nitrogen atoms and from 1 to 5 —CH$_2$COOM groups where M is selected from the group consisting of alkali metals and hydrogen atoms, about 2 to 15 weight percent of a compound selected from the group consisting of alkali metal nitrates and alkali metal nitrites, and about 2 to 15 weight percent of an alkali metal silicate.

9. A method of cleaning and removing rust from a metallic surface which comprises contacting the surface to be cleaned with an aqueous solution of a cleaning composition having a pH in the range of about 6.0 to 10.0, said composition comprising about 70 to 96 weight percent of a aminopolycarboxylic acid material selected from the group consisting of the tetrasodium salt of ethylenediaminetetraacetic acid, the pentasodium salt of diethylenetriaminepentaacetic acid, the trisodium salt of N-hydroxyethylethylenediaminetriacetic acid, the monosodium salt of N,N-di(2-hydroxyethyl)glycine and mixtures of the foregoing, about 2 to 15 weight percent of a compound selected from the group consisting of alkali metal nitrate and alkali metal nitrite, and about 2 to 15 weight percent of an alkali metal silicate.

10. The method of claim 9 wherein the aminopolycarboxylic acid material is a mixture of about 80 to 95 weight percent of the tetrasodium salt of ethylenediaminetetraacetic acid and about 5 to 20 weight percent of the monosodium salt of N,N-di(2-hydroxyethyl)glycine.

11. The method of claim 9 wherein the alkali metal silicate is sodium metasilicate.

12. A method of cleaning and removing rust from a metallic surface which comprises contacting the surface to be cleaned with an aqueous solution of a cleaning composition having a pH in the range of about 6.0 to 10.0, said composition comprising about 70 to 96 weight percent of a mixture, said mixture comprising about 80 to 95 weight percent of the tetrasodium salt of ethylenediaminetetraacetic acid and about 5 to 20 weight percent of the monosodium salt of N,N-di(2-hydroxyethyl)glycine, about 2 to 15 percent of sodium nitrate, and about 2 to 15 weight percent of sodium metasilicate.

13. A method of cleaning and removing rust from a metallic surface which comprises contacting the surface to be cleaned with an aqueous solution of a cleaning composition having a pH in the range of about 6.0 to 10.0, said composition comprising about 93 weight percent of a mixture, said mixture comprising about 89 weight percent of the tetrasodium salt of ethylenediaminetetraacetic acid and about 11 weight percent of the monosodium salt of N,N-di(2-hydroxyethyl)glycine, about 3.5 weight percent of sodium nitrate, and about 3.5 weight percent of sodium metasilicate.

References Cited

UNITED STATES PATENTS

| | | | |
|---|---|---|---|
| 2,396,938 | 3/1946 | Bersworth | 134—2 |
| 2,430,435 | 11/1947 | Sperry | 134—3 |
| 2,802,788 | 8/1957 | Flaxman | 252—105 |
| 2,992,995 | 7/1961 | Arden | 252—152 |

FOREIGN PATENTS

| | | |
|---|---|---|
| 563,357 | 9/1958 | Canada. |
| 451,025 | 7/1936 | Great Britain. |

OTHER REFERENCES

Automotive Chemical Specialties, Berkely Chemical Specialties Manufactures Association, April 1959 (pp. 91, 93, 95, 97, and 99 relied on) (copy in Sci. Lib.)

LEON D. ROSDOL, *Primary Examiner.*

S. D. SCHWARTZ, *Assistant Examiner.*

U.S. Cl. X.R.

252—105, 135, 136, 188